United States Patent [19]

Cimino

[11] Patent Number: 4,834,273
[45] Date of Patent: May 30, 1989

[54] CAMPER VAN CONVERSION KIT

[75] Inventor: Gerald D. Cimino, Colorado Springs, Colo.

[73] Assignee: Vans America, Inc.

[21] Appl. No.: 97,863

[22] Filed: Sep. 17, 1987

[51] Int. Cl.⁴ .............................................. B62D 43/02
[52] U.S. Cl. .............................. 224/42.21; 224/42.06; 224/42.28; 293/117; 293/155
[58] Field of Search .............. 224/42.01, 42.03, 42.05, 224/42.06, 42.08, 42.12, 42.21, 42.26, 42.28; 296/37.2; 70/259, 260; 293/117, 120, 126, 155; 292/DIG. 14

[56] References Cited

U.S. PATENT DOCUMENTS

| | | |
|---|---|---|
| 1,285,708 | 11/1918 | Hormes . |
| 1,542,107 | 6/1925 | Sutherland .................... 224/42.21 X |
| 1,995,088 | 4/1934 | Bellamy ............................ 293/106 |
| 2,698,118 | 12/1954 | Dickason ........................ 224/42.21 |
| 2,809,064 | 10/1957 | Dlugatch . |
| 3,394,666 | 7/1968 | Pearlman ........................ 108/129 |
| 3,448,904 | 6/1969 | Sahr .................................. 224/42.01 |
| 3,488,077 | 1/1970 | Miller .............................. 224/42.05 |
| 3,613,971 | 10/1971 | Betz ................................. 224/42.01 |
| 3,682,360 | 8/1972 | Fletcher et al. ................. 224/42.05 |
| 3,986,809 | 7/1976 | Beavers ............................ 425/388 |
| 4,065,166 | 12/1977 | Shoemaker ...................... 296/159 |
| 4,131,310 | 12/1978 | Martinson ....................... 296/160 |
| 4,266,817 | 5/1981 | Mason et al. .................... 293/117 |
| 4,375,306 | 3/1983 | Linder .............................. 312/250 |
| 4,410,117 | 10/1983 | Crawford et al. .............. 224/42.06 |

OTHER PUBLICATIONS

J. C. Whitney & Co., Catalog #354B (1976), p. 59.

Primary Examiner—Robert B. Reeves
Assistant Examiner—John M. Gruber
Attorney, Agent, or Firm—James E. Pittenger

[57] ABSTRACT

An apparatus for mounting a spare tire on the exterior of a motor vehicle is provided. The apparatus includes a support base which is capable of being rigidly affixed to the frame of a motor vehicle. The support base supports a swing down spare tire mounting bracket having means for mounting the spare tire. The spare tire mounting bracket is pivotally attached to the support base so that the mounting bracket can be pivotally swung about a generally horizontal axis between a first upright vehicle operating position and a second generally horizontally disposed vehicle access position. A catch means is also disclosed for releasably locking the swing-down bracket in its first upright position. In addition, bumper means affixed to the support base are disclosed for protecting the vehicle spare tire mounting apparatus. The mounting apparatus is capable of supporting a table for holding food and drink when the mounting apparatus has been pivotally swung down to its second horizontally disposed position. A tent attached at one end to the raised open rear hatchback of a motor vehicle is also shown.

13 Claims, 5 Drawing Sheets

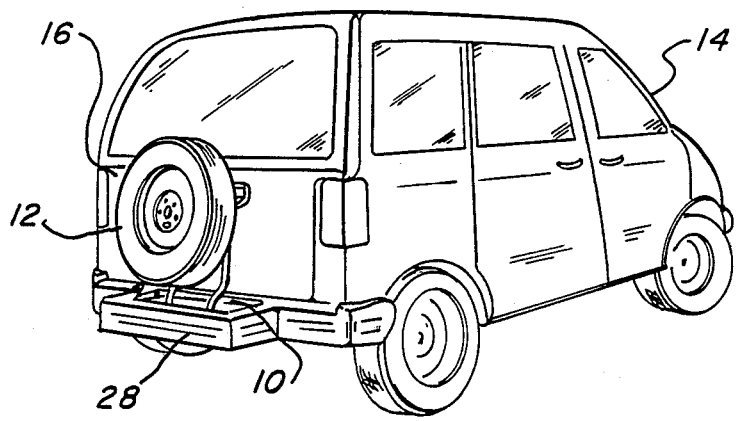
Fig_1
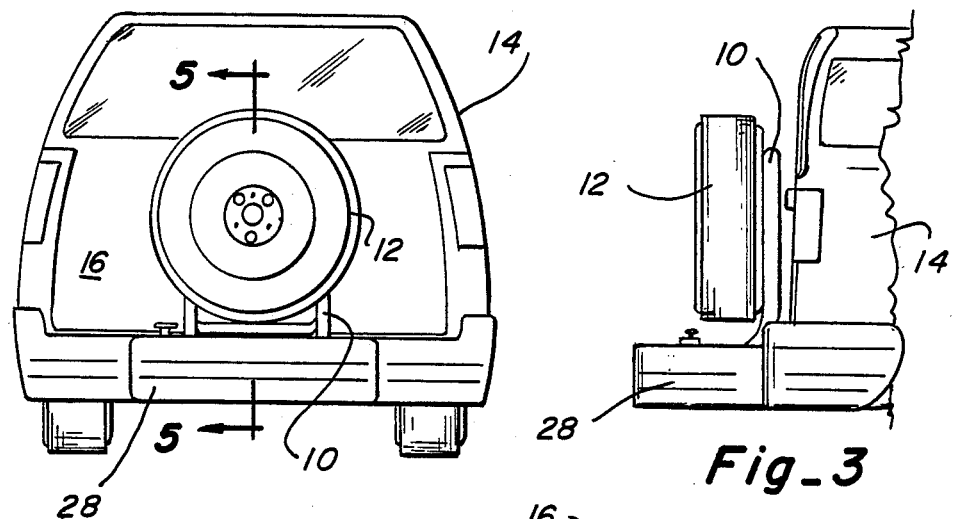
Fig_2
Fig_3
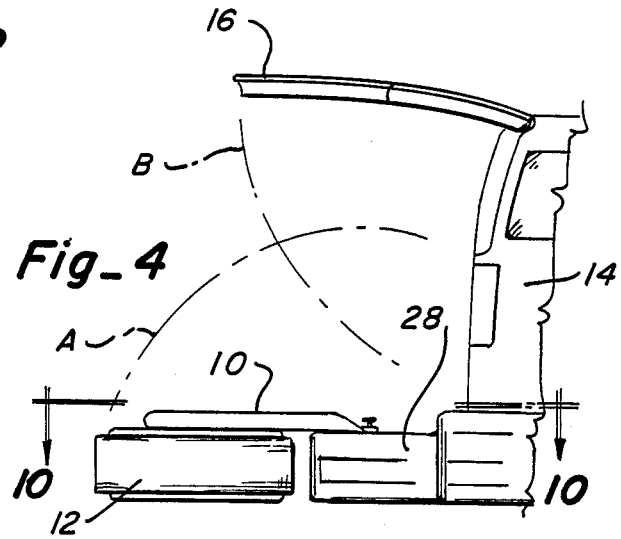
Fig_4

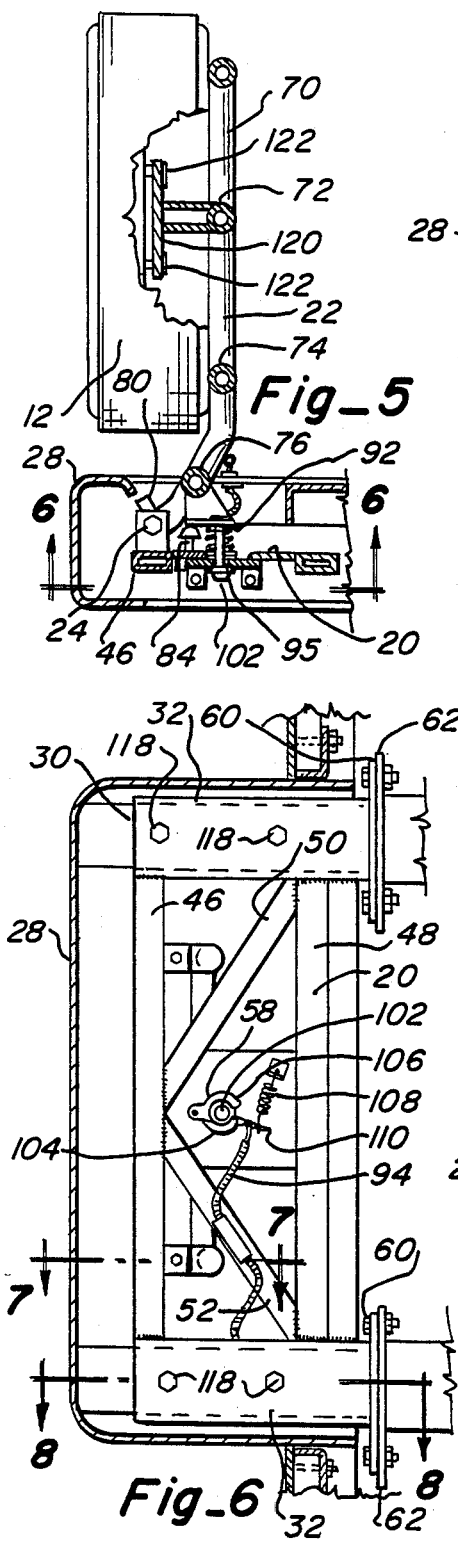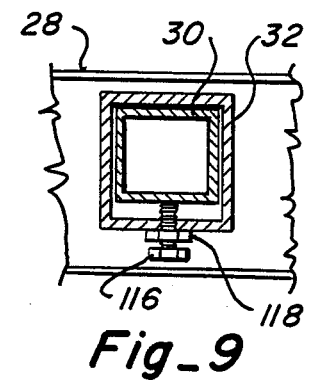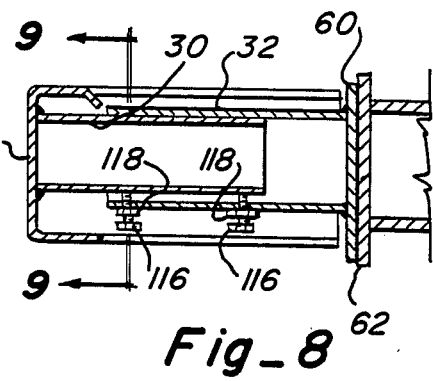

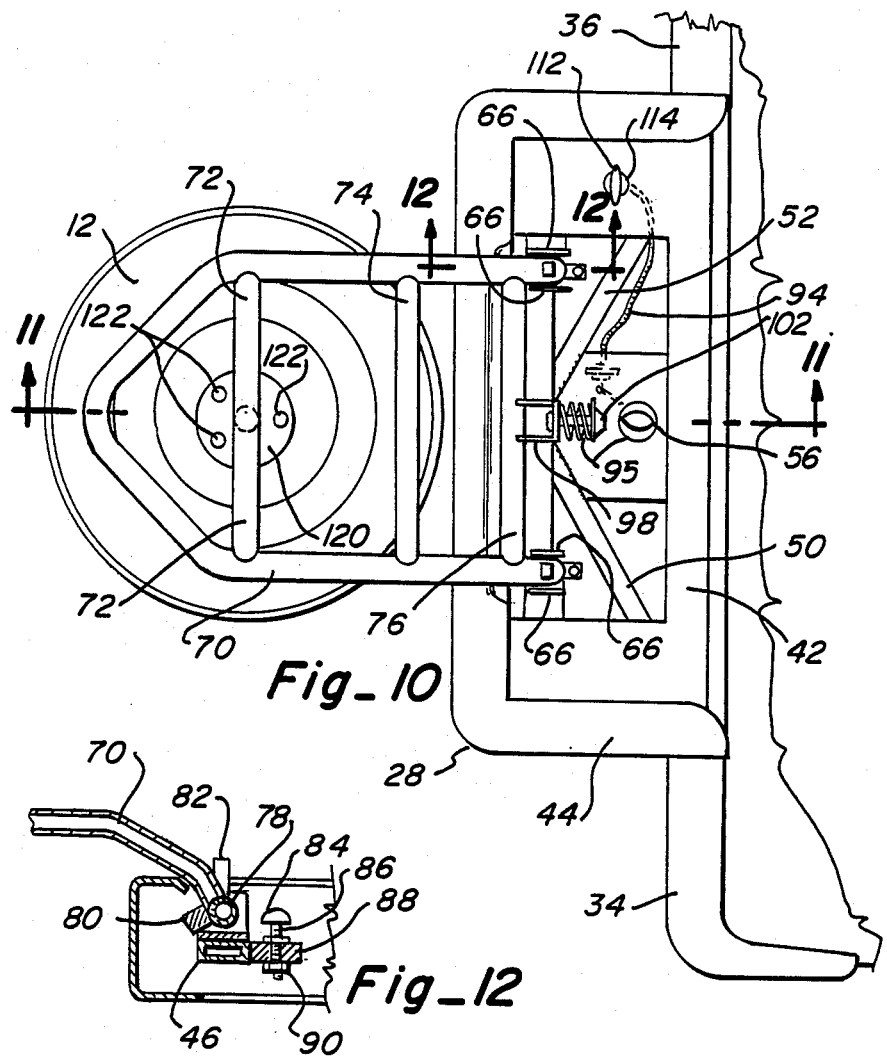
Fig_10
Fig_12
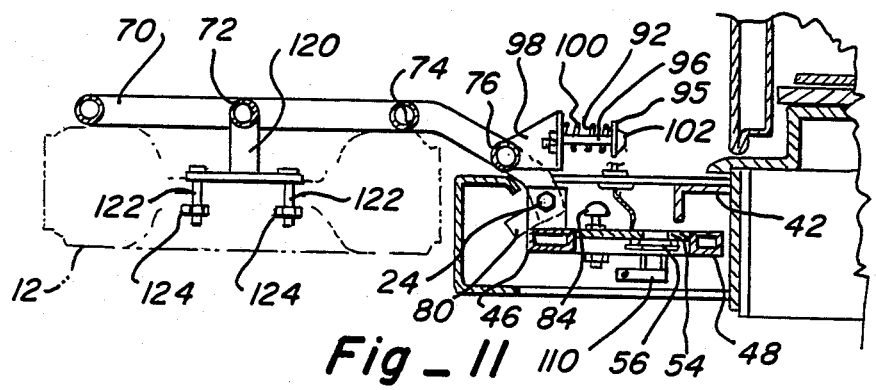
Fig_11

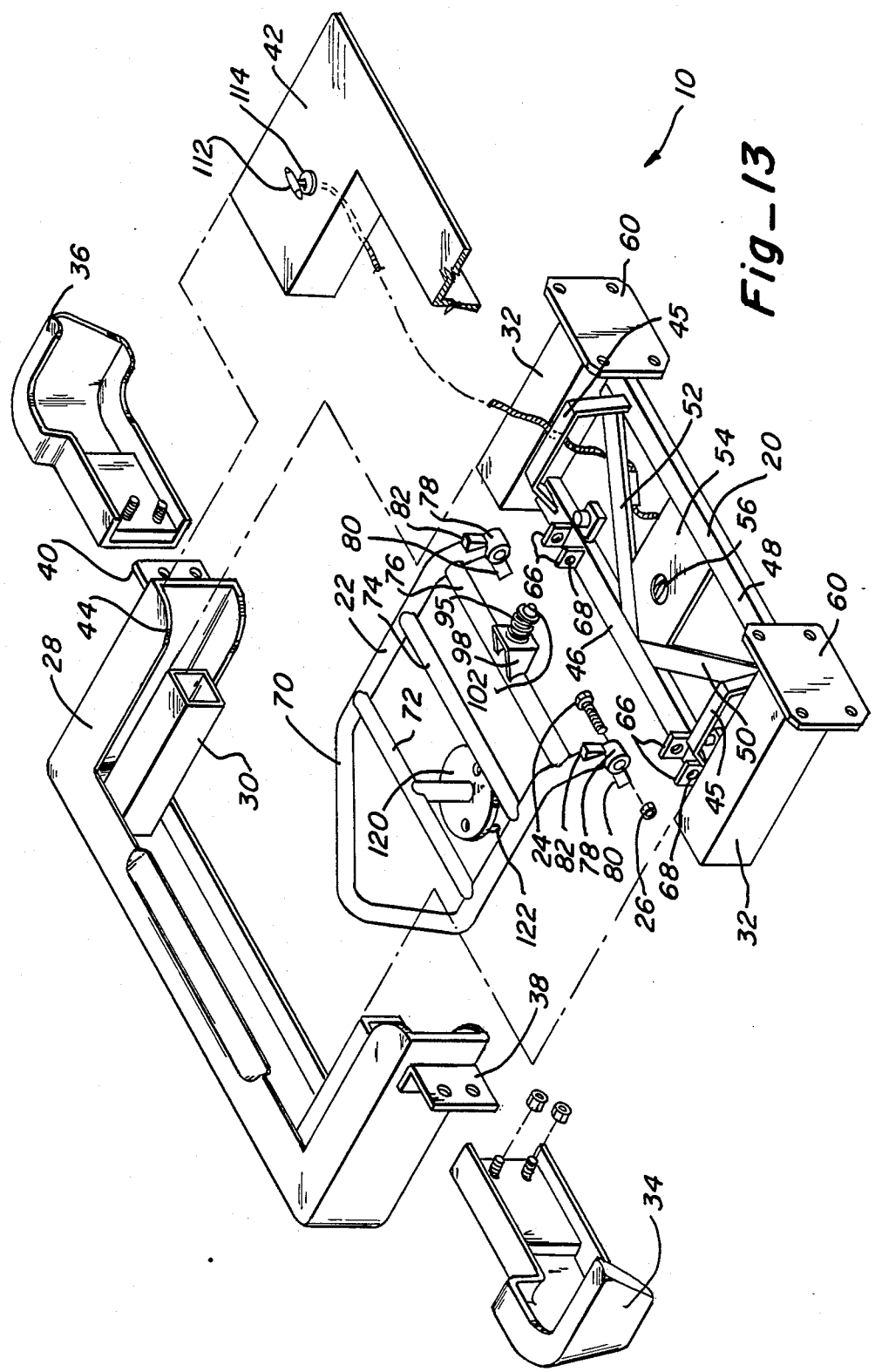
Fig_13

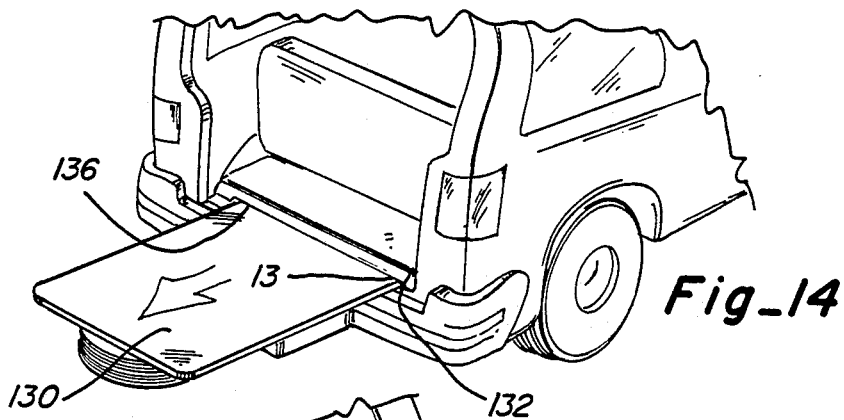
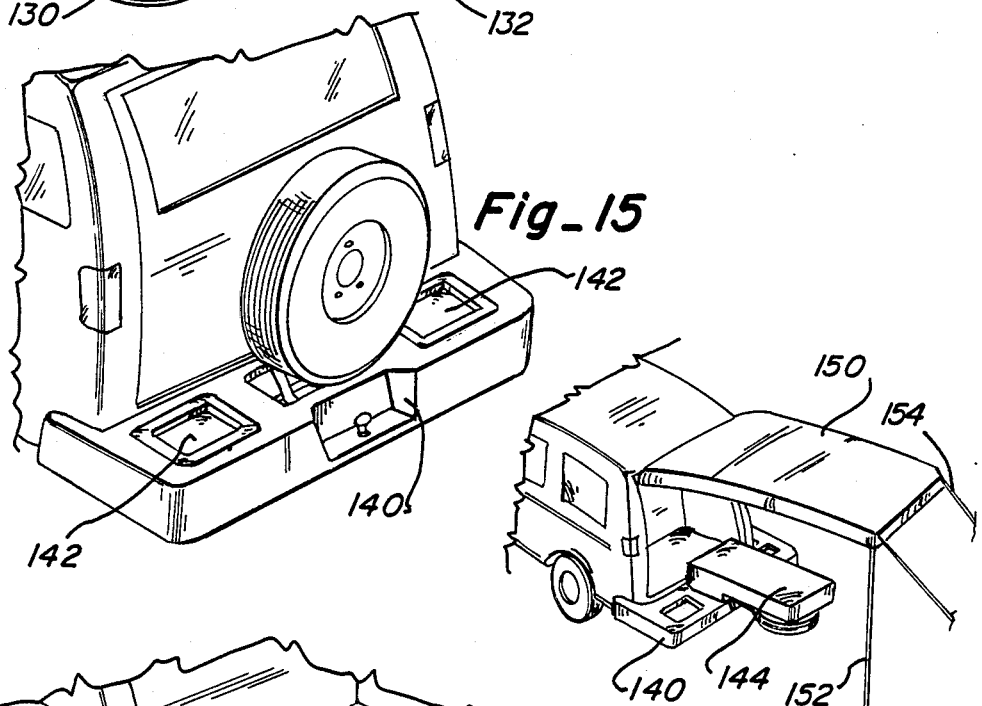
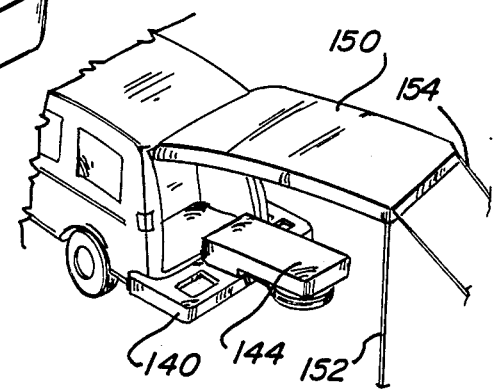
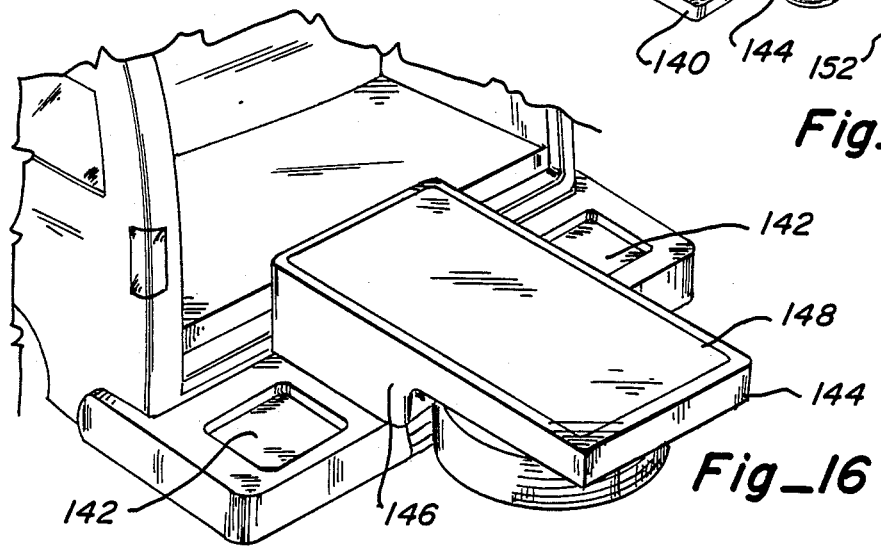

CAMPER VAN CONVERSION KIT

BACKGROUND OF THE INVENTION

The invention relates generally to an apparatus for mounting a spare tire on the exterior of a motor vehicle. More particularly, the invention relates to an exterior spare tire mounting apparatus which is capable of supporting a table for use by campers, picnickers and/or tailgaters attending sporting events.

Increased interest in camping, picnicking, tailgating at sporting events and other recreational activities has created a need for inexpensive vehicle attachments which will make pursuit of these activities more enjoyable and less cumbersome. To this end, many recreational vehicle attachments have been developed. Such attachments include tents for mounting on roof racks and camper bodies designed to be mounted and supported in the beds of pickup trucks.

While the aforementioned designs have undoubtedly fulfilled certain needs, there still remains a need for attachments which will make vehicles such as vans and certain 4×4's having rear doors or hatchbacks more useable in pursuing such recreational activities. Many of these vehicles having rear doors or hatchbacks particularly, the new mini-vans and mini-4×4's also suffer from space limitations. Accordingly, owners of these vehicles would welcome any attachment that would not only make their vehicle more enjoyable and useable for recreational activities but also provide the vehicle with more interior space.

A primary object of the present invention is to provide vehicles with more interior space by providing an apparatus for mounting the vehicle's spare tire on the vehicle's exterior.

Another object of the present invention is to provide an exterior spare tire mounting apparatus which can additionally be used to support a table for use by campers, picnickers and tailgaters attending sporting events.

A further object of the present invention is to provide an exterior spare tire mounting apparatus which can be easily swung into a position which facilitates access into the rear of a vehicle.

Another object of the present invention is to provide an exterior spare tire mounting apparatus which additionally includes bumper means having utility as steps and/or seats.

Yet a further object of the present invention is to provide a tent or canopy which is attachable to a rear hatchback having been swung upwardly into its open position.

INFORMATION DISCLOSURE STATEMENT

This statement is intended to comply with the applicant's acknowledged duty to inform the Patent Office of any pertinent information of which they are aware. The following information refers to the most pertinent patents of which the applicants have knowledge with respect to the subject matter of the present invention. Although other patents may be available which deal with this subject matter, they are believed to be less pertinent than the patents which are discussed herein.

The Beavers patent (U.S. Pat. No. 3,986,809) is directed to a tent for open ended van-type vehicles. The tent provides a foldable room extension which covers the rear portion of a van-type vehicle. An umbrella-like foldable structure is used to support the sidewalls and roof of the tent-like structure. The Shoemaker patent (U.S. Pat. No. 4,065,166) discloses an extension room for motor vehicles. The room includes a tent-like structure which has a floor board which extends outwardly from the open end of a vehicle. The open vehicle doors provide support for the floor structure and the tent is attached to the vehicle around the tent's forward edges by snaps provided on the sides and top of the vehicle.

The Martinson patent (U.S. Pat. No. 4,131,310) discloses a self-contained camping unit which can be mounted on the rear or sides of a vehicle as desired. The device provides a pivotal structure which includes a self-contained tent. The tent is supported along one edge by the vehicle and is allowed to pivot upwardly and opened to form a completely enclosed room structure.

The Linder patent (U.S. Pat. No. 4,375,306) discloses a cabinet and table unit which is mounted on the open rear portion of a pickup camper. The unit is outwardly pivotable and can be enclosed and slidably moved into the rear of the pickup truck for compact storage and transportation.

The Pearlman patent (U.S. Pat. No. 3,394,666) discloses a foldable utility table which can be positioned within a camper or van-type vehicle and slidably moved so as to be supported along one edge by the tailgate of the vehicle with legs providing support for the outer edge of the table.

As can be easily seen, none of these references directly read on or anticipate the applicant's invention which is described and claimed herein.

SUMMARY OF THE INVENTION

The present invention is directed to an apparatus for mounting a spare tire on the exterior of a motor vehicle which additionally is capable of supporting a table for use by campers, picnickers and others for recreational purposes. One embodiment of the present invention also includes a tent which is capable of being attached to the rear hatchback of a vehicle which has been swung upwardly into its open position.

The spare tire mounting apparatus of the present invention includes a support base which is capable of being rigidly affixed to the frame of a motor vehicle. The apparatus also includes a swing-down tire mounting bracket having means for mounting the spare tire thereon. The spare tire mounting bracket is pivotally attached to the support base so that the mounting bracket is capable of being pivotally swung about a generally horizontal axis between a first generally vertically disposed vehicle operating position and a second generally horizontally disposed vehicle access position. The apparatus further includes catch means for releasably locking the swing-down mounting bracket in its first generally vertically disposed position. A preferred embodiment of the spare tire apparatus additionally includes bumper means affixed to the support base which absorbs the impact of other objects to prevent or at least minimize damage to the vehicle, spare tire mounting apparatus and spare tire mounted on the apparatus.

Another embodiment includes a table which is sized and configured to be supported by and extend over the support base and mounting bracket of the spare tire mounting apparatus when the spare tire mounting bracket has been pivotally swung down into its second horizontally disposed position. The table is secured so that it is sufficiently stable to support food and drink.

Another embodiment of the present invention provides a tent or canopy which at one end is attachable to the rear hatchback of a vehicle which has been swung upwardly into its open position. The tent is supported at its outer end by poles extending to the ground which are secured in place by ropes extending between the top of the poles and the ground, the ropes being anchored to the ground with stakes.

BRIEF DESCRIPTION OF THE DRAWINGS

Other features of this invention will appear in the following description and appended claims, reference being made to the accompanying drawings forming a part of the specification where like referenced characters designate corresponding parts in the views.

FIG. 1 is a perspective view showing the spare tire mounting apparatus of the present invention mounted on the rear end of a van;

FIG. 2 is a rear view of the van illustrated in FIG. 1;

FIG. 3 is a partial side view of the van illustrated in FIG. 1 showing the mounting apparatus of the present invention as it would appear from the side of the vehicle;

FIG. 4 is a partial side view of the van illustrated in FIG. 1 showing the mounting apparatus of the present invention after it has been swung down into its horizontally disposed second position with the van's hatchback having been swung upwardly into its open position;

FIG. 5 is a cross-sectional view taken along the lines 5—5 of FIG. 2;

FIG. 6 is a cross-sectional view taken along the lines 6—6 of FIG. 5;

FIG. 7 is a cross-sectional view taken along the lines 7—7 of FIG. 6;

FIG. 8 is a cross-sectional view taken along the lines 8—8 of FIG. 6;

FIG. 9 is a cross-sectional view taken along the lines 9—9 of FIG. 8;

FIG. 10 is a cross-sectional view taken along the lines 10—10 of FIG. 4;

FIG. 11 is a cross-sectional view taken along lines 11—11 of FIG. 10;

FIG. 12 is a cross-sectional view taken along lines 12—12 of FIG. 10;

FIG. 13 is an exploded isometric perspective view of the spare tire mounting apparatus of the present invention illustrated in FIGS. 1-12;

FIG. 14 is a perspective view of a pull-out table of the present invention which is being supported by a horizontally disposed spare tire mounting apparatus of the present invention;

FIG. 15 is a perspective view of a mounting apparatus of the present invention having a bumper means provided with seats;

FIG. 16 is a perspective view of a table of the present invention being supported by the mounting apparatus of FIG. 15 after it has been swung down into its second horizontally disposed position; and FIG. 17 is a perspective view of a tent or canopy of the present invention having one end attached to the raised, open rear hatchback of the motor vehicle illustrated in FIGS. 15-16.

DETAILED DESCRIPTION OF THE INVENTION

Referring now to the drawings, FIGS. 1 through 4 illustrate various views of an apparatus 10 of the present invention for mounting a spare tire 12 on the rear end of a van 14 having a hatchback 16. FIGS. 1 through 3 illustrate apparatus 10 in its upright or vertical position which is the position the mounting apparatus should be in when operating the vehicle. FIG. 4 illustrates mounting apparatus 10 in its swing-down, horizontal position which allows people to gain access to the rear of the van after opening the rear hatchback. The dotted line identified by letter A illustrates the path taken by the mounting apparatus when it is pivotally swung from its upright position to its horizontal position. This position permits rear hatchback 16 to be swung upwardly into its open position as illustrated in FIG. 4. Dotted line B identifies the path taken by hatchback 16 when it is raised to its open position.

FIGS. 5 through 13 illustrate the details of mounting apparatus 10 of the present invention. As best illustrated in FIG. 13, apparatus 10 generally includes a support base 20 and a tire mounting bracket 22 which is pivotally anchored to support base 20 by a pair of parallel, axially aligned pivot bolts 24 and nuts 26. The details of the mounting bracket's pivotal attachment to the support base will be discussed in more detail below.

Apparatus 10 also includes a generally U-shaped central bumper 28 which is preferably made from a length of steel channel bar. Bumper 28 is attached to support base 20 by a pair of parallel, square bar extensions 30 which telescopically engage with a larger pair of square bar extensions 32 of the support base. The means for securing the telescoping extensions to each other will be discussed in more detail below. Central bumper 28 is also provided with a pair of right and left bumpers 34 and 36, respectively. The right and left bumpers are bolted to the central bumper via brackets 38 and 40, respectively, which are welded to central bumper 28.

FIG. 10 illustrates that apparatus 10 also has a top cover 42 which is located against the underside surface of the central bumper's upper portion, i.e. upper portion 44 of the bumper. Top cover 42 serves to cover the interior of the support base when the mounting apparatus is in its upright position. The top cover is supported by extensions 32 of the support base and a parallel pair of top cover supports 45. The cover is preferably made from a resilient plastic material which will not vibrate during operation of the vehicle and thereby create noise.

Turning now to the details of support base 20, it can be seen in FIG. 13 that extensions 32 of the support base are parallel and rigidly connected to each other by a pair of parallel, hollow rectangular cross bars 46 and 48. The cross bars are welded at their respective ends to the opposing sides of extensions 32. Further support for base 20 is provided by cross braces 50 and 52, each of which is welded at one end to a center section of cross bar 46 and at its other end to a side of its respective extension 32 at a location adjacent the weld for cross bar 48. A support plate 54 is also welded to the support base between adjoining braces 50 and 52 and the center of cross bar 48. Support plate 54 is provided with an opening 56 which is aligned with the center of a C-shaped female clamp 58 which is pivotally attached to the underside of plate 54 as best illustrated in FIG. 6. The operation and function of female clamp 58 will be described below.

Returning to FIG. 13, it can be seen that support base 20 has a pair of parallel flanges 60, each of which is welded onto an end of its respective extension 32. The flanges enable the support base to be bolted to the frame of the van or other motor vehicle as such is illustrated in FIG. 6 which shows flanges 60 bolted to the standard bumper flanges 62 of the vehicle's frame. FIG. 13 also illustrates that cross bar 46 has two parallel pairs of upstanding brackets 66 which are welded to the cross bar at their lower disposed edges. Brackets 66 are provided with one bolt hole 68 each, the holes being aligned so that each pair may receive one of the bolts 24.

Turning now to the spare tire mounting bracket 22, it can be seen in FIG. 33 that mounting bracket 22 generally includes an outer U-shaped tubular frame 70 which is supported by three horizontal tubular braces 72, 74 and 76 which are welded at their respective ends to outer tubular frame 70. Tubular outer frame 70 is also provided with a pair of parallel, collar-like pivots 78 which are welded onto the free ends of tubular frame 70. The mounting bracket is pivotally anchored to the support base by positioning each collar-like pivot 78 between its respective pair of brackets 66 so that the bores of each pivot and pair of brackets 66 are axially aligned. A bolt 24 is then inserted through the aligned bores of each pair of brackets with pivot positioned therebetween and the assembly is secured by threading a nut 26 onto the exposed end of its respective bolt 24. When anchored as such, mounting bracket 22 will be able to pivotally swing about the axis passing through aligned bolts 24.

To prevent the mounting bracket from swinging downwardly beyond its horizontal position illustrated in FIG. 4, each collar pivot 78 has a horizontal positioned limit stop 80 welded to it as illustrated in FIGS. 11 and 12. The horizontal limit stops are sized and configured to abut up against an edge of cross bar 46 when the mounting bracket is swung down into its horizontal position. Accordingly, further downward movement of the mounting bracket is prevented.

Each collar pivot 78 also has a vertical limit stop 82 welded to it which is sized and configured to abut against an adjustable stop 84 as illustrated in FIG. 7. Stops 82 and 84 cooperate to prevent the mounting bracket from swinging beyond the desired upright position and thereby prevent the bracket from contacting and possibly damaging the rear surface of the van's body. Adjustable stop 84 has a threaded shaft 86 which is threaded into a threaded bore provided in a block 88 welded to cross bar 46. Adjusting the height of stop 84 adjusts the point at which the mounting bracket is stopped from further swinging. The adjustable stop's height is adjusted by turning the shaft 86 in the threaded bore provided in support block 88. Nuts 90 are also threaded onto shaft 86; however, on opposite sides of block 88. Nuts 90, when tightened, prevent shaft 86 from turning or unthreading and thereby maintain stop 84 at the desired weight.

Mounting bracket 22 is releasably locked in its upright position to support base 20 by a catch means 95. The catch means 95 prevents the mounting bracket from swinging down to its horizontal position during operation of the vehicle which for rather obvious reasons is to be avoided. The catch means 95 includes the aforementioned C-shaped clamp 58 mounted on the underside of plate 54, a spring-loaded pin assembly 92 and a cable release means 94.

As best illustrated in FIGS. 10 and 11, the pin assembly has a shaft 96 which is welded to a bracket 98 which, in turn, is welded to tubular cross brace 76 of the spare tire mounting bracket. A coil spring 100 is mounted on shaft 96 and secured thereto or held in place by a conically shaped head portion 102 which is welded to the end of shaft 96. The pin assembly and the clamp are aligned so that the head 102 forces free ends 104 and 106 of the C-shaped clamp apart slightly when the head portion first engages the free ends of the C-clamp which occurs as mounting bracket 22 is moved into its vertical position. When mounting bracket 22 is moved farther to its final vertical position (i.e. where it is prevented from further movement by vertical limit stops 82 and 84) head portion 102 passes through free ends 104 and 106 of the clamp. The free ends then contract about the pin 96 and thereby lock or secure the underside of head portion 102 against the underside of the clamp's free ends 104 and 106. A coiled spring 108 anchored at one of its ends to plate 54 and secured at its other end to a bar-like extension 110 of free end 104 facilitates contraction of free end 104 about the pin, thereby insuring that the free ends of the clamp are clamped about the pin and thereby in locked engagement with the head 102. Previously mentioned coil spring 100 which is mounted on the shaft 96 serves as a shock absorber to prevent the pin assembly from breaking when subjected to road stresses encountered during operation of the vehicle.

Cable release means 94 when activated releases the pin assembly from locking engagement with the clamp which allows the user to swing the mounting bracket down to its horizontal position. As illustrated in FIG. 6, cable means 94 has one end attached to bar-like extension 110. The cable's other end as illustrated in FIGS. 10 and 13 has a pull handle 112 affixed to it which is slidably mounted in a housing 114 mounted in top cover 42. To release the pin assembly from the clamp, a user pulls upwardly on the handle which causes the cable's other end to pull on bar-like extension 110. This action pulls the clamp's free end 104 away from free end 106, thereby enabling the head 102 to be withdrawn from the clamp. The pin's head is withdrawn from the clamp by simply moving the mounting bracket towards its horizontal position. The pull handle may then be released by the user. Coil spring 108 will automatically return the pull handle to its resting position against top cover 42. The free ends of the clamp will also return to their contracted position, accordingly, in position to receive the pin when the mounting bracket is returned to its upright position.

FIGS. 8 and 9 illustrate the means provided for releasably securing the telescoping extensions of the support base and central bumper together. As illustrated therein, each pair of telescoping extensions 30, 32 is secured, (i.e. prevented from relative movement therebetween) by two threaded bolts 116. Each bolt has a threaded shaft which is threaded into a threaded bore extending through both the support base extension's bottom and a plate 118 welded thereto. When bolts 116 are tightened, the telescoping extensions 30 and 32 will be frictionally engaged to each other and thereby prevented from relative movement therebetween. To remove the bumper from the support base, bolts 116 are loosened until the end of the bolt and the bumper extension's bottom surface are no longer in frictional engagement. The bumper extensions may then be pulled out of the support base extensions.

The mounting of spare tire 12 to mounting bracket 22 is best illustrated in FIGS. 10 and 11. As illustrated, a bracket 120 is welded to the top tubular cross support 72. Three bolts 122 are welded onto bracket 120 and the tire is positioned on the bolts so that the bolts extend through bolt holes (not numbered) provided in the spare wheel. Nuts 24 are then tightened onto the bolts to tightly secure the spare tire to mounting bracket 22.

FIG. 14 illustrates a pull out table 130 being supported by mounting apparatus 10 of the present invention. Table 130 is sized and configured to be horizontally pulled out from a sleeve 132 mounted on the floor of a vehicle. The table is also sized to extend over support base 20 and spare tire mounting bracket 22 when the mounting bracket is swung down into its horizontal position. The table can be stabilized, (i.e. prevented from sideways movement or tipping) by anchoring or slidably securing the table's corners 134 and 136 within the sleeve mounted on the floor of the vehicle.

Table 130 may, quite understandably, be used for many purposes. However, it is anticipated that it will be primarily used to hold food and drink or possibly camping equipment. Accordingly, it should be of great value to campers, picnickers, and tailgaters attending sporting events.

FIGS. 15 through 17 illustrate an embodiment of the present invention having a wide bumper 140 with seats or steps 142 mounted on the right and left sides of the bumper. Seats 142 may be sat upon or stepped upon to allow users access to the vehicle. In FIGS. 16 and 17, it can be seen that this embodiment can also be provided with a built-up table 144 having sides 146 and a top surface 148 which is higher (i.e. farther from the ground) than that of table 130 illustrated in FIG. 14. Adults will generally find the higher surface of the table 144 easier to use. Table 144 is supported on its underside by the horizontally disposed spare tire mounting bracket and support base similar to that of apparatus 10. Table 144 may be secured by bolting its bottom edge supported by the vehicle floor to the floor (not shown) or by other means known to those skilled in the relevant art. Resilient plastic or metallic snap clips could also be affixed to the table's underside. These clips would snap about the tubular members of the mounting bracket to secure the table to the mounting bracket.

FIG. 17 illustrates a tent or canopy 150 made of lightweight nylon, preferably, which is attached to and supported at one end by the vehicle's open hatchback. The canopy's outer end is supported by poles 152 which are secured in place by ropes 154 staked to the ground. The canopy shelters table 144 and its users from the elements. It is also possible to provide side flaps to the canopy which can be lowered to form a tent to provide shelter for the users. Canopy 150 should be of particular interest to tailgaters who often attend sporting events during inclement weather.

While the above invention has been shown and described in detail in this application, it should be understood that this invention is not to be limited to the exact form disclosed and changes in detail and construction of the invention may be made without departing from the spirit thereof.

What is claimed is:

1. An apparatus for mounting a spare tire on the exterior of a motor vehicle, said apparatus comprising:
   (a) a support base means which is rigidly affixed to the body of the vehicle at the vehicle's end;
   (b) a bumper means attached to the support base, said bumper means is affixed to said support base means so that the support base means is located between the vehicle and the bumper means so that the bumper means shields the support base means and vehicle from impact with other objects, said bumper means having a horizontally disposed U-shaped center section which is rigidly affixed to the support base means and centered thereupon, said bumper means attachment to the support base means is releasable and rigidly affixed to the support base means by bolt means provided on said support base means so that the bumper means is capable of being removed from the support base means, the releasable attachment for said bumper means comprises a pair of parallel, rigidly affixed extensions which telescopically engage with a pair of parallel extensions rigidly affixed to the support base means, said telescoping extensions supporting the bumper means being releasable from and adjustable with respect to said support base means;
   (c) a swing-down tire mounting bracket having means for mounting said spare tire thereon and being pivotally attached to the support base means so that the mounting bracket is capable of being pivotally swung about a generally horizontal axis between a first generally vertical disposed vehicle operating position and a second generally horizontal disposed vehicle access position; and
   (d) catch means for releasably locking said swing-down bracket in said first position.

2. Apparatus as claimed in claim 1 wherein the support base and the tire mounting bracket are located on the vehicle midway between the vehicle's right and left sides.

3. Apparatus as claimed in claim 1 wherein the bumper means has two horizontally disposed portions located, respectively, on opposite sides of the support base, each portion extending, respectively, to its side of the vehicle.

4. Apparatus as claimed in claim 1 wherein said bumper means also having first and second sections, said first section being rigidly affixed to one side of said U-shaped center bumper section and extending horizontally along the vehicle's end to the vehicle's side, said second section being rigidly affixed to the opposite side of said U-shaped center section and extending horizontally along the vehicle to the vehicle's opposite side, said first and second sections extending adjacent said vehicle but being spaced therefrom.

5. Apparatus as claimed in claim 4 wherein each bumper portion includes a horizontal upwardly facing top surface extending from an outer edge of the bumper means to an inner edge adjacent the vehicle surface but spaced therefrom.

6. Apparatus as claimed in claim 5 wherein the top surfaces include portions sized and configured to serve as steps which are capable of being stepped upon to facilitate access to the vehicle's roof.

7. Apparatus as claimed in claim 5 wherein the top surfaces include portions sized and configured to serve as seats.

8. Apparatus as claimed in claim 1 wherein the catch means includes a spring-loaded pin assembly with head portion, a spring-loaded C-shaped clamp with free ends and cable release means, said pin assembly being rigidly affixed to said mounting bracket, said clamp being rigidly affixed to said support base and aligned with said pin assembly so that when the mounting bracket is pivotally swung to its first vertical position, said head portion of the pin assembly forces the free ends of the C-shaped clamp apart slightly so that the clamp receives the head portion, one of said free ends being spring-loaded by a spring affixed between the free end and the support base so that after receiving said head portion said spring-loaded free end contracts about a shaft of the pin assembly and against the underside of the head portion to lockingly engage therewith, said cable release means being affixed at one end thereof to the spring-loaded free end of the C-shaped female clamp and having a handle affixed to its other end which is slidably affixed to the support means, said cable release means being capable of releasing said clamp from locking engagement so that the mounting bracket is capable of being pivotally swung to its second horizontally disposed position.

9. Apparatus as claimed in claim 1 further comprising second horizontal position stop means for preventing the mounting bracket from pivotally swinging beyond its horizontal position when the mounting bracket is pivotally swung to this position from the first position.

10. Apparatus as claimed in claim 9 wherein the second horizontal position stop means includes a projection rigidly affixed to the mounting brackets and being sized, configured and located on the mounting bracket so that when the mounting bracket is swung to its second horizontal position said projection abuts against a rigid portion of said support base which prevents the mounting bracket from swinging beyond its horizontal position.

11. Apparatus as claimed in claim 1 further comprising first vertical position stop means for preventing the mounting bracket from: pivotally moving beyond its first upright position when the bracket is pivotally swung to its first position from its second position, said vertical stop means preventing the bracket from contacting the vehicle's surface.

12. Apparatus as claimed in claim 11 wherein the first vertical position stop means includes a projection rigidly affixed to the mounting bracket which is sized, configured and located to abut against an adjustable stop means which is threadably secured to a threaded bore provided in the support means so that the mounting bracket's first upright position can be adjusted.

13. Apparatus as claimed in claim 1 wherein the mounting bracket is pivotally attached to the support base by a pair o parallel, axially aligned bolt means which extend through axially aligned bores provided in the mounting bracket.

* * * * *